United States Patent [19]

Adicoff et al.

[11] 4,134,848

[45] Jan. 16, 1979

[54] COMPOSITE FOR IMPROVED STRIPLINE BOARD MATERIAL

[75] Inventors: Arnold Adicoff, Ridgecrest; Eugene C. Martin, China Lake; Rena Y. Yee, Ridgecrest, all of Calif.

[73] Assignee: The United States of America as represented by the Secretary of the Navy, Washington, D.C.

[21] Appl. No.: 700,279

[22] Filed: Jun. 28, 1976

[51] Int. Cl.$^2$ ............................................. C08K 9/06
[52] U.S. Cl. ............................. 252/63.2; 260/42.15
[58] Field of Search ...................... 260/42.15; 252/63.2

[56] References Cited

U.S. PATENT DOCUMENTS

| | | | |
|---|---|---|---|
| 3,254,140 | 5/1966 | Hagemeyer et al. | 260/878 B |
| 3,437,550 | 4/1969 | Paul | 260/42.18 |

FOREIGN PATENT DOCUMENTS

| | | | |
|---|---|---|---|
| 1095700 | 12/1967 | United Kingdom | 260/42.15 |
| 1044503 | 10/1966 | United Kingdom. | |

OTHER PUBLICATIONS

Sphere-Filled Plastic Composites, Theory, Testing; Applications, James Ritter, in Polyblends and Composites, Interscience Pub. 1970, Applied Polymer Symposia, No. 15.

Modern Plastics Encyclopedia 1970, vol. 47, No. 1A, Oct. 1970, pp. 342 & 398 & 400.

*Primary Examiner*—James H. Derrington
*Attorney, Agent, or Firm*—R. S. Sciascia; W. Thom Skeer; T. R. Schulte

[57] ABSTRACT

A stripline board material of hollow glass microspheres chemically bonded to a coating material and physically held in a polymeric matrix, preferably homo- or co-polymers of ethylene, propylene and/or styrene. The coating material is a difunctional silane with one functional group bound to the glass and the other bound either to the matrix or to a copolymer of a structure similar to the structure of the matrix. In the latter case, the sphere-silane-copolymer forms an intimate mixture with the matrix.

5 Claims, No Drawings

COMPOSITE FOR IMPROVED STRIPLINE BOARD MATERIAL

BACKGROUND OF THE INVENTION

In a variety of electronic devices, metal conductive strips are embedded in, glued to, or enclosed between two dielectric sheets. These devices may be simple printed circuit boards, or more sophisticated microwave stripline phase adjusters, direction couplers or the like. In these sophisticated devices, the dielectric sheet assumes an active role in the device and aside from providing support, the dielectric material must transmit signal pulses. This function is referred to as stripline transmission and the dielectric material used for this function is termed herein, "stripline board." Discussions of devices which may employ a variety of stripline board materials are found in U.S. Pat. No. 3,513,414 and U.S. Pat. No. 3,575,674.

A wide variety of dielectric material has been used as stripline board, for example, polystyrene, polyethylene, and other polyolefins. These polymers are used when, as is often the case, material with a low dielectric constant (3 or less) is required. This material must have a uniform dielectric constant within each sheet and the dielectric constant should not vary from sheet to sheet. The dielectric constant should be independent of frequency over the band width need for a particular application. The material should not dissipate excessive energy, i.e., it should have a low loss tangent, below 0.0018 at 10 GHz. The mechanical stability of the dielectric material is also important. Shrink, warpage, thermal expansion and cold flow should be minimized.

Unfortunately, presently used polymeric stripline boards have unsatisfactory mechanical and/or dielectric properties, especially in the high frequency area of 10 GHz and above.

In their search for improved dielectric materials, the inventors turned to glass sphere reinforced plastic composites. Glass beads or microspheres have been used for many years, but their use as a filler/reinforcement in plastics is relatively recent. They are commonly used to reduce costs and improve mechanical properties of structural plastics in the form of so-called "syntactic foams" in which the glass beads are physically held in suspension by the plastic binder or matrix. Glass beads as used in these composites are generally considered to be chemically inert. A good discussion of glass beads in plastic composites is given by James Ritter in *Polyblends and Composites*, ed. by Paul F. Bruins, Applied Polymer Symposium No. 15 (Interscience Publishers 1970).

SUMMARY OF THE INVENTION

Hollow glass microspheres are chemically bonded to a coating material and physically held in a polymeric matrix. The chemical coating comprises a first treatment with a silane which is difunctional, that is having two reactive groups. One group, such as the siloxane linkage or a halogen, will link the silane monomer to the surface of the glass through hydroxy groups on the glass surface. The second pendant group, for instance an amino or vinyl group, is then linked to a polymer chain. The polymer is chosen so as to react with the silane pendant reactive group. For instance, polymers containing acrylic acid and other carboxylic acids can be used with the amino groups, and styrene and other olefins can be used with the vinyl group. This polymer may itself be the matrix of the composite, in which case the glass microspheres would be both chemically and physically bonded to the matrix. Alternatively, this polymer may be chosen so as to be soluble in another polymer which is then added to form the physical matrix.

The composite, that is the total ingredients which go into the stripline board, is then molded to form the stripline board. The board will display a low coefficient of expansion because the coated microspheres are in intimate contact with the matrix polymer.

The low dielectric constant of the composite results from the fact that a portion of the total volume is air contained in the glass microspheres. To insure the structural integrity of the spheres, they are first annealed in an oven.

DESCRIPTION OF THE PREFERRED EMBODIMENT

Hollow glass microspheres are available in sizes ranging from 10 to 20 microns in diameter. Glass has a low thermal coefficient of expansion (1.8 to 2.8 $\times$ 10$^{-6}$ in./in./°F.) but a high dielectric constant (4 to 6). However, by using hollow glass spheres in which a portion of the total volume is glass, the rest being air within the spheres, the dielectric constant of the spheres will be significantly reduced because of the low dielectric constant of air (1.0).

Often microspheres, as commercially available are unsuitable for molding applications because they may shatter or break during mixing and/or molding.

For maximum effectiveness these spheres should remain hollow and intact throughout the process. To achieve this durable character, it was found desirable to anneal the microspheres in a glass oven set for a pyrex programmed cycle of slowly heating to the annealing temperature (565–600° C.) and then slowly cooling to room temperature. The entire cycle is about 5 hours.

Annealing, as used generally and in the present specification, refers to the process of removing strains and brittleness from glass by holding it at an elevated temperature for a certain time, then gradually cooling it at a predetermined rate.

One of the requirements for stripline boards used in advanced systems is that the board must have a uniform dielectric constant and loss tangent. Thus the composition of the board must be very uniform. To accomplish this it is necessary to pulverize or "micronize" the matrix polymer and then prepare a uniform mixture of polymer and microspheres. Standard grinding techniques are not satisfactory because non-uniform particle size results or the polymer is contaminated by the grinding equipment.

The following procedures for preparing a circuit board are cited for the purpose of illustration.

MICRONIZATION OF THE MATRIX POLYMER

To a pressure vessel was added 25 g of pelletized polyallomer and 450 ml of n-pentane. "Polyallomer" refers generally to a type of polymer which varies in chemical composition without change in crystalline form. Specifically, and as used herein, it denotes a block copolymer of propylene and ethylene having low density but high resistance to heat and mechanical distortion. The polyallomer used in the experiments described herein was POLYALLOMER from Eastman Kodak Co. A variety of polyolefins having similar mechanical-electrical and thermal properties are suitable for use in the present invention and are available commercially.

The dispersion was heated at 160° C. (260 psi or 182 kg/cm²) for seven hours and then allowed to cool to ambient temperature. The swollen micronized polymer was collected by vacuum filtration and then dried at 60° C. in a vacuum. The dried polymer was placed in a glass jar containing glass balls and milled to break up clusters. This was sieved through a 20-mesh screen.

MODIFICATION OF THE MICROSPHERES

Forty grams (40.4 g) of annealed FTF-15 microspheres (Emerson & Cuming, Inc.) were added to a solution consisting of 2.0g of 3-aminopropyltriethoxysilane, 10 ml of distilled water and 90 ml of acetone. The dispersion was shaken on a wrist shaker for two hours. The microspheres were collected by filtration, washed with acetone and vacuum dried. The reaction is shown as follows:

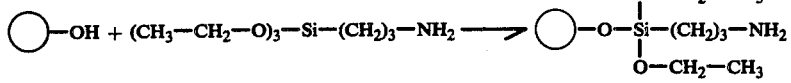

To 1.88 g of an acrylic acid/ethylene copolymer (20 percent acrylic acid) was added 200 ml of xylene. The mixture was heated to 110° C. and stirred until a homogenous solution was obtained. 20 g of the treated microspheres were added and stirring continued at 100° C. for one hour, at which time the mixture was cooled to room temperature, filtered, washed with isopropanol and dried in a vacuum. The coated spheres were placed in a glass jar containing glass balls and tumbled to break up the clusters. The reaction is shown as follows:

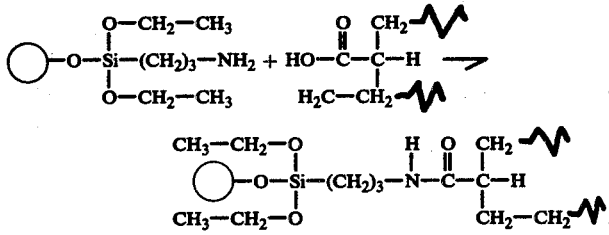

MOLDING CONDITIONS

The molding compound was prepared by mixing 25 weight percent of modified microspheres and 75 weight percent of the micronized polymer. The mixture was then blended in a powder matrix overnight.

The mixture was placed in the mold; the mold was evacuated and then heated. The coating copolymer is soluble in the polyallomer, which, being thermoplastic, is molten. The composite was molded at 204° C. and 1000psi (6.9 mega Pascals). The board diameter was 4 inches (10.2 cm) and the thickness was 64 to 66 mils (0.16–0.17 cm).

DIELECTRIC PROPERTIES

The boards were cut into 2.7 in. × 2.7 in. (6.9 cm × 6.9 cm) squares and their electric properties were determined using the 3M Stripline Test Method, an ASTM standard method. To determine the uniformity of these boards, measurements were made along two arbitrarily chosen normal directions on the boards. The fact that the values obtained from the two normal directions are equal shows that the boards were uniform. This conclusion is further supported by the very similiar dielectric properties of a large number of boards from the same formulation. The results obtained for two types of circuit boards are listed below.

|  | 75% Polyallomer 25% Microspheres | 75% Polypropylene 25% Microspheres |
|---|---|---|
| Dielectric Constant (10.9 GHz) | 2.07 | 2.0 |
| Loss Tangent (10.9 GHz) | 0.0013 | 0.0015 |

Various alternate methods can be suggested. For example, another compound such as bis-dimethylaminodimethylsilane can be used to react with the OH groups on the glass surface. The only requirement for the compound used to modify the glass surface is that it forms a chemical bond with the glass and has an active site for attaching a polymer. Polymers other than those cited can be attached to the coated microspheres. The choice will be dictated by the properties of the polymer. These include the dielectric constant, thermal coefficient of expansion, loss tangent, etc. Other compounds known to be suitable as finishes for glass fibers, such as methacrylato chromic chloride may also be satisfactorily employed. See p. 13, *Glass Reinforced Plastics*, Phillip Morgan ed., (Philosophical Library Inc. 1955).

One alternative procedure is to use only one polymer. That is, the difunctional silane coating is added, then the matrix is grafted on to the silane coating. Hollow glass microspheres are treated with a vinylchorosilane such as dimethylvinylchlorosilane ClSi(CH₃)₂(C₂H₃). The Cl group of the chlorosilane will react with OH groups on the surface of the glass forming a chemical bond. The pendant vinyl group is an active site for grafting and a monomer such as propylene or styrene can be readily grafted onto this group forming the polymer. The amount of polymer buildup on the spheres can be controlled and experiments can be made to determine the optimum. The coated microspheres can be molded and the polymer coating will form the continuous phase of the composite.

What is claimed is:
1. Dielectric material comprising:
   hollow, air-filled, glass microspheres;
   a coating of a difunctional silane chemically bonded to said microspheres;
   an ethylene/acrylic acid copolymer chemically bonded to said silane; and
   a second polymer selected from the group consisting of homo- or copolymers of ethylene, propylene, and/or styrene, said second polymer forming a solid matrix physically containing said spheres and forming an intimate mixture with said spheres, said coating, and said ethylene/acrylic acid copolymer;

said spheres being uniformly dispersed in said matrix so as to give uniform dielectric properties to said dielectric material.

2. The composition of claim 1 wherein said silane is 3-aminopropyltriethoxysilane.

3. A process for manufacturing dielectric material comprising the steps of:
   (a) Chemically coating hollow, air-filled glass microspheres with a difunctional silane;
   (b) bonding said silane to an ethylene/acrylic acid copolymer which is soluble in a second, thermoplastic polymer selected from the group consisting of homo- or copolymers of ethylene, propylene and/or styrene;
   (c) forming a finely dispersed mixture of said microspheres, said ethylene/acrylic acid copolymer, and said second, thermoplastic polymer;
   (d) heating said finely dispersed mixture whereby said ethylene/acrylic acid copolymer is dissolved in said second, thermoplastic polymer;
   (e) forming said mixture into a shape appropriate for said dielectric material.

4. The process of claim 3 further comprising the step of annealing said microspheres.

5. The process of claim 3 wherein said difunctional silane is 3-aminopropyltriethyoxysilane.

* * * * *